United States Patent
Katoozian

(10) Patent No.: US 6,536,786 B1
(45) Date of Patent: Mar. 25, 2003

(54) STACKABLE PUSHCART

(75) Inventor: Kambiz Katoozian, Kirkland, WA (US)

(73) Assignee: K & M Engineering, Kirkland, WA (US)

( * ) Notice: Subject to any disclaimer, the term of this patent is extended or adjusted under 35 U.S.C. 154(b) by 0 days.

(21) Appl. No.: 09/595,324

(22) Filed: Jun. 16, 2000

Related U.S. Application Data

(60) Provisional application No. 60/140,276, filed on Jun. 18, 1999.

(51) Int. Cl.$^7$ ............................................. B62D 39/00
(52) U.S. Cl. ............................ 280/33.993; 280/33.991; 280/33.996
(58) Field of Search .................. 280/33.991, 33.993, 280/33.996, 33.997, 33.998, 827, 33.992, 47.34, 47.38, 79.2

(56) References Cited

U.S. PATENT DOCUMENTS

| | | | | |
|---|---|---|---|---|
| 2,590,048 A | * | 3/1952 | Sides | 280/33.996 |
| 3,797,861 A | * | 3/1974 | Shoffner | 280/33.996 |
| 4,381,870 A | | 5/1983 | Muellner | 280/33 |
| 4,765,636 A | * | 8/1988 | Speer | 280/47.11 |
| D305,011 S | * | 12/1989 | Pipon | D12/128 |
| 5,149,115 A | * | 9/1992 | Sampedro | 280/33.998 |
| D332,592 S | * | 1/1993 | O'Dea et al. | D12/129 |
| 5,261,690 A | * | 11/1993 | Kluber | 280/648 |
| 5,330,210 A | | 7/1994 | Lambrecht | 280/33.993 |
| 5,354,079 A | | 10/1994 | Hettenbach | 280/33.991 |
| 5,474,483 A | | 12/1995 | Sun | 446/71 |
| 5,595,394 A | | 1/1997 | Adamson | 280/33.993 |
| 5,645,290 A | | 7/1997 | Gaffney et al. | 280/33.998 |
| 5,765,871 A | * | 6/1998 | Wyman et al. | 280/827 |
| 5,865,449 A | * | 2/1999 | Castaneda | 280/33.996 |
| 6,003,894 A | * | 12/1999 | Maher | 280/639 |

* cited by examiner

Primary Examiner—Richard Chilcot
Assistant Examiner—James S. McClellan
(74) Attorney, Agent, or Firm—Dean A. Craine

(57) ABSTRACT

A stackable, vehicle-shaped, pushcart designed for transporting small children and cargo that can be stacked with a plurality of other pushcarts in a small confined space. The pushcart includes a lightweight frame assembly, an upward extending handle assembly, and a pivoting vehicle-shaped body. The vehicle-shaped body is disposed horizontally over the frame assembly and pivots upward on its rear section around a support member. The frame assembly is designed to be horizontally stacked with longitudinally aligned adjacent pushcarts when the body is disposed vertically. The frame assembly includes two front caster wheels and two rear large diameter wheels. The vehicle-shaped body includes a fully extending floor and has a unique outer shape thereby enabling the body to be vertically aligned so that the pushcart can be slid together and horizontally stacked in a compact manner with other similar pushcarts.

10 Claims, 6 Drawing Sheets

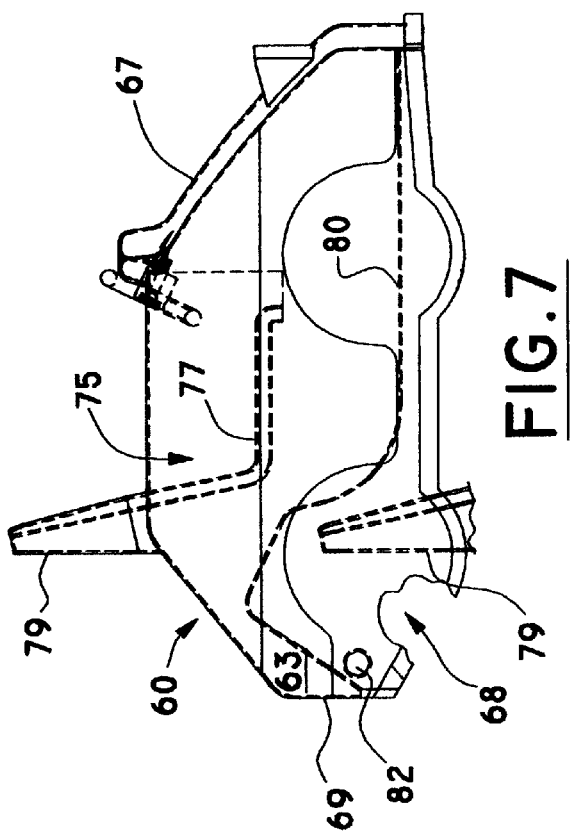
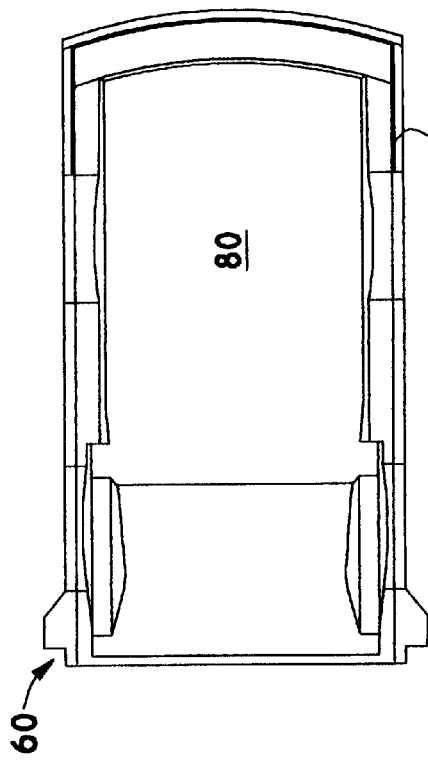

STACKABLE PUSHCART

This is a utility patent application is based on the provisional patent application (Ser. No. 60/140,276) filed on Jun. 18, 1999.

BACKGROUND OF THE INVENTION

1. Field of the Invention

This invention relates to children's pushcarts, and, more particularly, to pushcarts that appeal to small children and are stackable for compact storage.

2. Description of the Related Art

Pushcarts for parents to transport children, packages, and luggage in airports, shopping malls, or other large public areas are well known. It is also well known to include a vehicle-shaped body to the pushcart that small children may ride in.

Safety and adequate storage for empty pushcarts are two concerns for storeowners, shopping mall operators, and airport operators who provide pushcarts for parents with small children. To address their safety concern, pushcarts must be constructed sufficiently durable for a young child, use minimal moving parts, and include features which prevent injury due to misuse. To address their storage concern, pushcarts are usually able to fold into a compact configuration that can be stacked with other folded carts to reduce storage space.

SUMMARY OF THE INVENTION

It is an object of the present invention to provide a pushcart for transporting small children in shopping malls and airports.

It is another object of the present invention to provide such a pushcart that is sufficiently durable and safe to use.

It is another object of the present invention to provide such a pushcart that appeals to small children.

It is further object of the present invention to provide such a pushcart that can be folded into a compact configuration and then stacked with other folded pushcarts to reduce storage space.

These and other objects of the present invention are met by a stackable, vehicle-shaped, pushcart designed for transporting small children in large stores, shopping malls, airport terminals and the like. The pushcart includes a lightweight, lower frame assembly, an upward extending handle assembly attached to the rear section of the frame assembly, and a pivoting vehicle-shaped outer body that is disposed over and supported by the frame assembly during normal use. When stored, the body rotates into an upward extending, perpendicularly aligned position inside the handle space for compact storage. The front section of the frame assembly is U-shaped and includes two side members which are spaced widely apart at one end and converge at their forward ends to form a planar, conical-shaped structure. The relative positions and shapes of the handle and frame assemblies are sufficient so that the front section of the frame assembly on an adjacent, longitudinally aligned rear pushcart may extend under the handle assembly and partially extend into the central space in the front pushcart thereby reducing floor space for storage. The frame assembly also includes two front caster wheels attached to the front section and two rear wheels attached to the rear section so that the pushcart may be easily pushed and turned on a flat surface. An optional anti-tip means is attached to the frame which prevents the pushcart from rotating rearward when excessive downward pressure is applied to the handle.

A lightweight, vehicle-shaped body is disposed horizontally over the frame assembly which, as mentioned above, is able to pivot upward on its rear section around the rear section of the frame assembly. The body includes a seat with an upward, diagonally aligned back member and a fully extending floor panel. Formed on the bottom surface of the body is an upward extending cavity designed to receive the back of the seat in an adjacent position when stacked together. The dimensions and overall shaped of the body is sufficient so that the body may pivot into the handle space created under the handle assembly. An optional bag may be attached to the handle assembly to transport packages when shopping. An optional bracing means between the body and the frame assembly is also provided to assist the user in lowering or raising the body over the frame assembly.

BRIEF DESCRIPTION OF THE DRAWINGS

FIG. 7 is a sectional side elevational view of the stackable pushcart.

FIG. 8 is a top plan view in section of the vehicle-shaped body.

DESCRIPTION OF THE PREFERRED EMBODIMENT(S)

Figure 1:
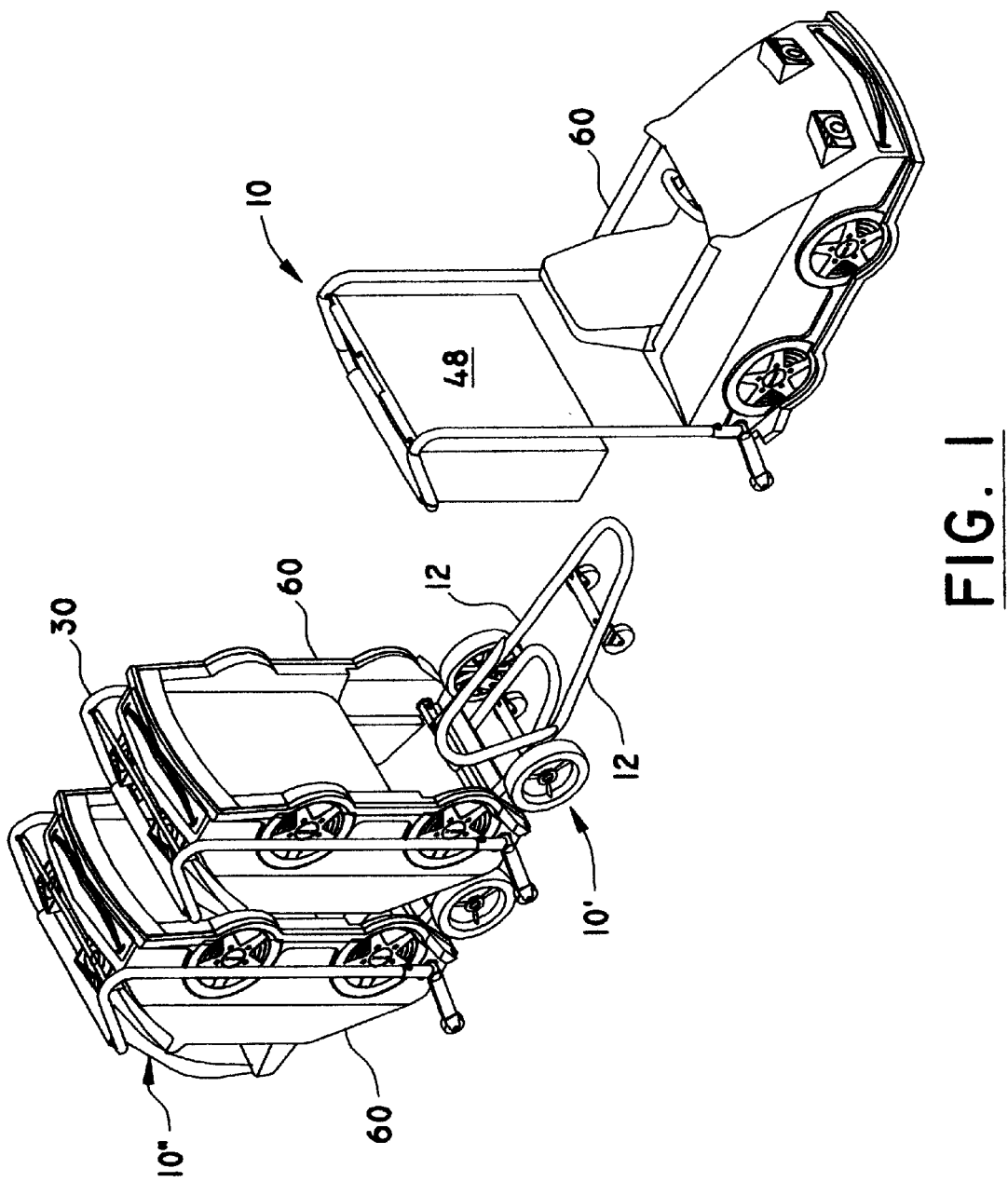
FIG. 1 is a perspective view of three stackable pushcarts.
Figure 2:
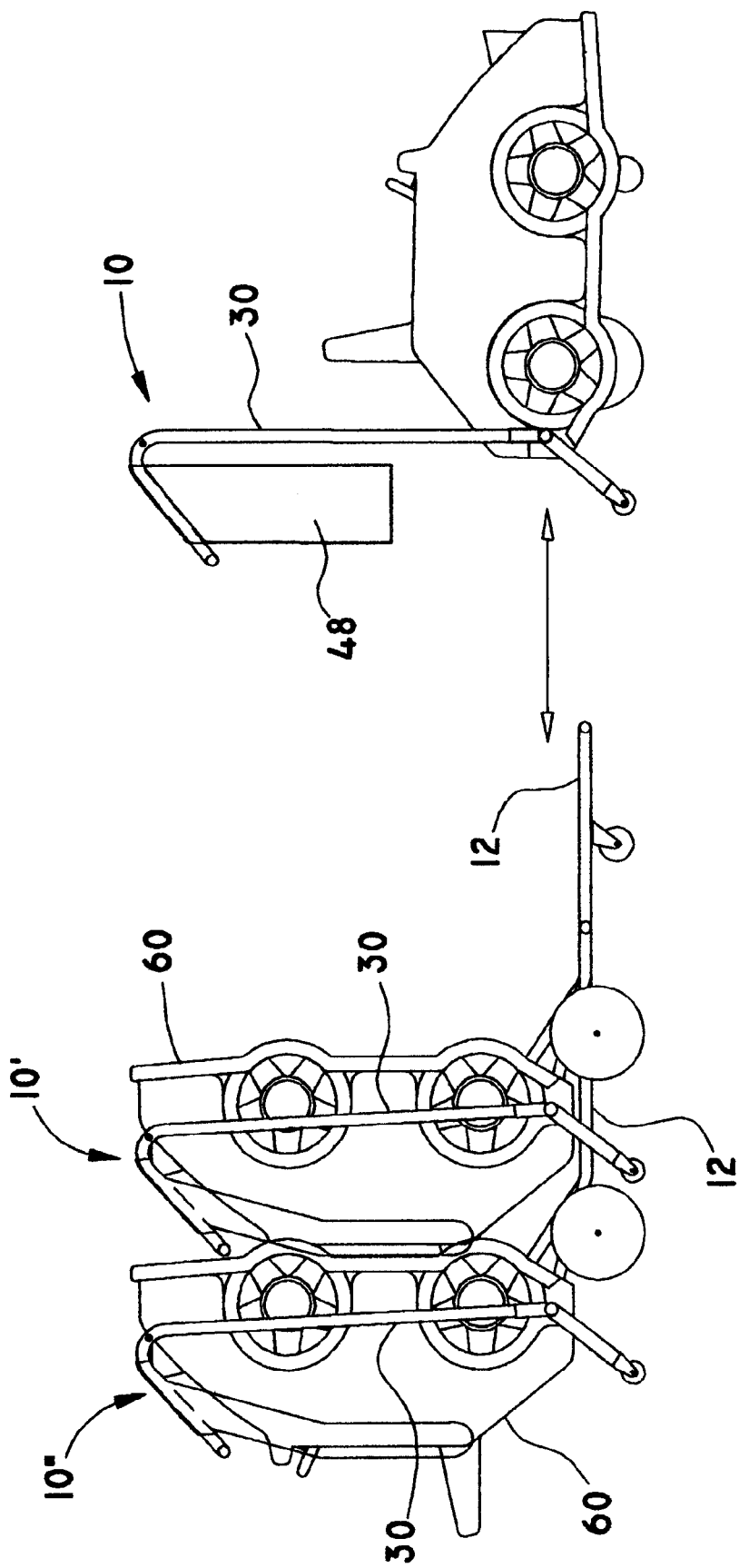
FIG. 2 is a side elevational view of the three stackable pushcarts shown in FIG. 1.

Disclosed is a stackable, vehicle-shaped, pushcart 10 designed for transporting small children in large stores, shopping malls and airport terminals. The pushcart 10 includes a lightweight, lower frame assembly 12, an upward extending handle assembly 30 attached to the rear section 20 of the frame assembly 12, and a pivoting vehicle-shaped outer body 60. The outer body 60 is disposed over and supported by the frame assembly 12 during normal use and then rotates into an upward extending, perpendicularly aligned position for compact storage with other pushcarts 10', 10" as shown in FIGS. 1 and 2.

Figure 3:
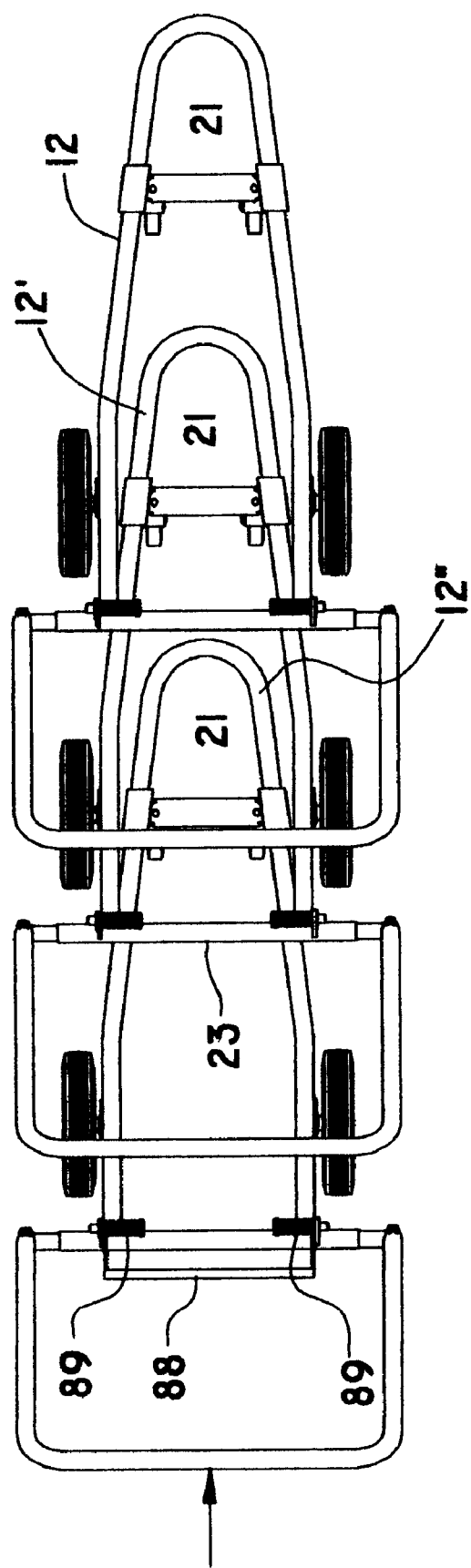
FIG. 3 is a top plan view of three stackable pushcarts.
Figure 4:
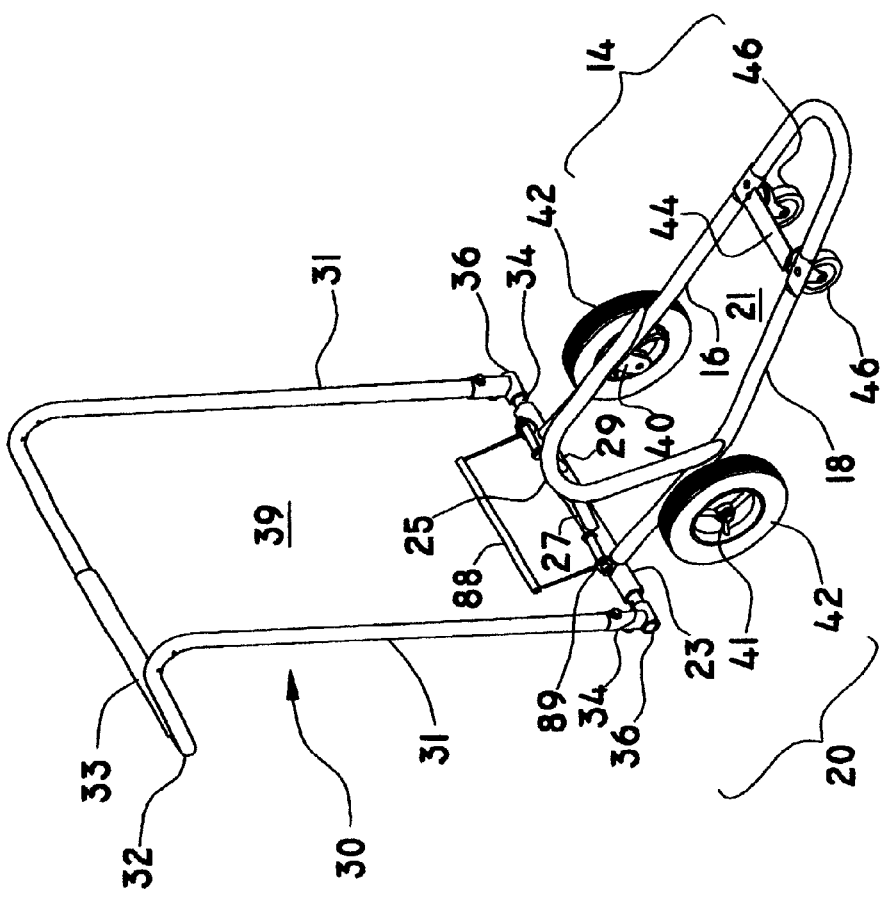
FIG. 4 is a partially exploded perspective view of the frame assembly and handle assembly.
Figure 6:
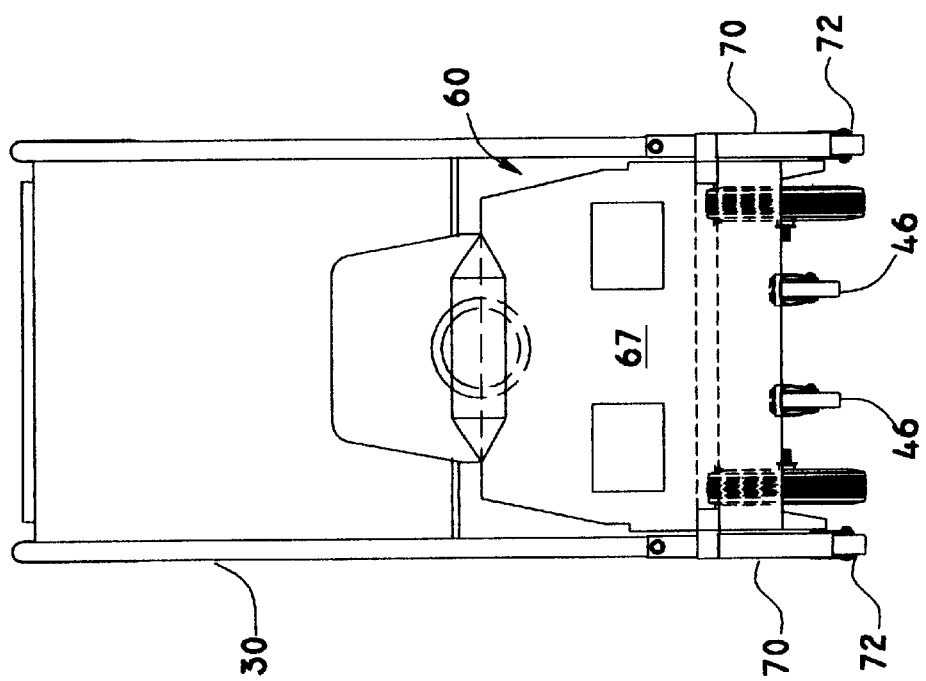
FIG. 6 is an front end elevational view of the stackable pushcart shown in FIG. 5.
Figure 5:
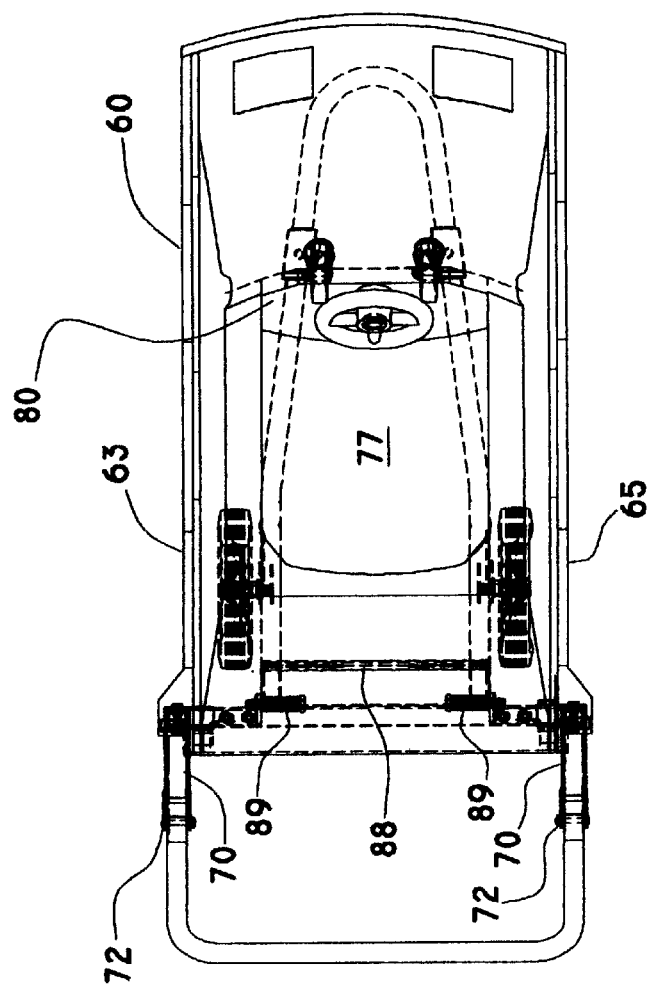
FIG. 5 is a top plan view of a stackable pushcart.

As shown in FIGS. 3, 4 and 5, the front section 14 of the frame assembly 12 is U-shaped and includes two side members 16, 18 which are spaced widely apart at their rearward ends and converge at their forward ends. The rear section 20 of the frame assembly 12 comprises the side members 16, 18 being aligned parallel. As seen in the elevational view in FIG. 4, the side members 16 and 18 in the rear section 20 also curve upward to provide clearance for the frame assembly 12' on an adjacent, rearward located pushcart 10 (shown in FIG. 3) to slide into the central space 21 created between the two side members 16, 18.

The rear section 20 of the frame assembly 12 also includes an elevated, transversely aligned hollow, outer tube member 23, a rearward diagonally oriented, inverted U-shaped brace member 25, and two forward oriented, upward extended short brace members 27, 29. During assembly, the upper ends of the short brace members 27, 29 are spaced apart and attached at one end to the outer tube member 23 and attached at an opposite end to the U-shaped brace member 25 to support the U-shaped brace member 25 in a rearward diagonal orientation. The length of the outer tube member 23 is slightly greater than the width of the rear section 20 of the frame assembly 12. Disposed longitudinally inside the outer tube member 23 is an inner tube member 34. The inner tube member 34 is slightly longer and is centrally located and fixed inside the outer tube member 23.

As shown more clearly in FIG. 4, attached to each opposite side of the rear section 20 of the frame assembly 12 is a vertically aligned wheel axle brace 40. Extending laterally from each wheel axle brace 40 is an axle 41 to which one rear wheel 42 is attached. Attached transversely to the front section 14 of the frame assembly 12 is a transversely aligned front wheel brace 44 to which a pair of pivoting caster wheels 46 is attached.

Attached to the rear section 20 of the frame assembly 12 is a vertically aligned handle assembly 30. The handle assembly 30 is U-shaped and includes two vertically aligned, opposite handle members 31 and an interconnecting, horizontally aligned cross handle member 32. A handle space 39 is formed between the handle members 31. In the preferred embodiment, the upper section of each handle member 31 extends rearward thereby placing the handle member 32 closer to the user. An optional handle grip 33 may be attached to the cross handle member 32 to improve handling.

Attached to each end of the inner tube member 34 is an L-shaped handle coupler 36 which receives the end of the handle member 31 to connect the handle assembly 30 to the frame assembly 12. In the embodiment shown, the handle coupler 36 includes two perpendicularly aligned openings designed to receive the ends of the inner tube member 34 and the adjacent, upward extending handle member 31. Suitable connectors, such as bolts and nuts, (not shown) are used to connect each handle coupler 36 to the ends of the adjacent inner tube 34 and handle member 31. As shown in FIGS. 1 and 2, an optional bag 48 made of flexible materials, such as nylon mesh material, may be attached to the cross handle member 32 to transport packages when shopping.

As shown in FIGS. 7 and 8, the vehicle-shaped body 60 includes two side walls 63, 65, a sloped front surface 67, and a rear sloped surface 69. Rigid brace members 71 extend longitudinally and transversely over the bottom section of the body 60 to provide additional support and rigidity. Formed inside the body 60 is a seat 75 with a horizontal seat rest 77 and a diagonally aligned back member 79, and a fully extending floor panel 80. The floor panel 80 extends across the bottom of the body 60 thereby preventing a child's feet from touching the floor while riding on the pushcart 10. Formed on the bottom surface of the body 60 is an upward extending cavity 68 designed to receive the back member 79 of a seat 75 or an adjacent pushcart 10 when stacked together.

As discussed above and as shown more clearly in FIGS. 1 and 2, the body 60 is designed to pivot rearward around the inner tube member 34. Formed on each side wall of the body 60 near the rear surface 69 is a bore 82. During assembly, the body 60 is placed over the frame assembly 12 so that the outer ends of the inner tube member 34 extends laterally and through the two bores 82 formed on the body 60. When the handle coupler 36 is attached to the ends of the inner tube member 34, the body 60 is captured on the inner tube member 34 and is able to freely rotate approximately ninety (90) degrees between horizontal and vertical aligned positions.

As discussed above, the handle assembly 30 and frame assembly 12 are complimentary in shape so that the frame assembly 12 of an adjacent, longitudinally aligned rear pushcart 10 may partially extend into the central space 21 located in the frame assembly 12 of a front pushcart 10. The height, width, length and overall shaped of the body 60 is sufficient so that the body 60 may fit into the handle 39 located beneath and behind the handle assembly 30 when the body 60 is pivoted into the upward position. The designs and functions of the frame assembly 12, handle assembly 30, and the body 60 all enable the pushcarts 10 to be horizontally stacked in a compact manner.

An optional support bar 88 is attached to the frame assembly 12 and used to assist the user in selectively raising and lowering the body 60 over the frame assembly 12. The support bar 88 is attached to the frame assembly 12 with spring-loaded brackets 89.

An optional anti-tip means may be provided on the rear section 20 of the frame assembly 12 designed to prevent the pushcart 10 from pivoting rearward when excessive downward pressure is applied to the handle assembly 30. In the preferred embodiment, the anti-tip means includes two spaced apart, diagonal legs 70 that extend rearward from the rear section 20 of the frame assembly 12 behind the rear wheels 42. Small wheels 72 may be attached to the distal ends of the legs 70 that enable the pushcart 10 to continue rolling when the anti-tip means is used.

In the preferred embodiment, the frame assembly 12 and handle assembly 30 are made of one inch diameter steel tubing, while the body 60 is made of fiberglass or plastic approximately ⅛ to ¼ inch thick.

In compliance with the statute, the invention described herein has been described in language more or less specific as to structural features. It should be understood, however, that the invention is not limited to the specific features shown, since the means and construction shown, comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A stackable pushcart, comprising:
   a. a frame assembly, said frame assembly includes two side members which converge to form a U-shaped front section and two parallel side members to form a rear section;
   b. at least one front wheel attached to said front section of said frame assembly;
   c. a pair of rear wheels attached to said rear section of said frame assembly;
   d. an upward extending handle assembly perpendicularly aligned and attached to said rear section of said frame assembly, said handle assembly including an inverted, U-shaped handle member and a pair of handle couplers capable of attaching the opposite ends of said handle members to said frame assembly and to hold said body to said frame assembly;
   e. a vehicle-shaped body disposed over and covering said frame assembly, said body including an upward extending cavity formed on a bottom surface designed to receive a portion of said body on an adjacent pushcart when said frame as assemblies are longitudinally aligned and horizontally stacked together; and,
   f. a pivoting means disposed between said frame assembly and said vehicle-shaped body enabling said vehicle-shaped body to rotate between a longitudinal position over said frame assembly and a perpendicularly aligned position over said rear section of said frame assembly.

2. The stackable pushcart, as recited in claim 1, wherein said pivoting means is a pair of bores formed on opposite sides of said vehicle-shaped body, designed to connect to the rear section of said frame assembly.

3. The stackable pushcart, as recited in claim 1, further including a pair of rear wheel brackets attached to the opposite sides of said rear section of said frame assembly, each said wheel bracket further including an axle to which one said rear wheel is attached.

4. The stackable pushcart, as recited in claim 1, wherein said front wheel is a caster wheel.

5. The stackable pushcart, as recited in claim 1, further including a means for carrying cargo attached to said handle assembly.

6. The stackable pushcart, as recited in claim 5, wherein said means is a flexible bag.

7. The stackable pushcart, as recited in claim 1, further including an anti-tip means attached to said frame assembly to prevent rearward rotation of said pushcart during use.

8. The stackable pushcart, as recited in claim 7, where said anti-tip means is at least a rearward, diagonally extending leg attached to said rear section of said frame assembly.

9. The stackable pushcart, as recited in claim 8, wherein said diagonally extending leg further includes a wheel attached to its distal end.

10. The stackable pushcart, as recited in claim 1, wherein said vehicle-shaped body has a fully extending floor.

\* \* \* \* \*